United States Patent [19]

Waitzman

[11] 3,827,412

[45] Aug. 6, 1974

[54] EXHAUST RECIRCULATION

[75] Inventor: Dennis Carl Waitzman, Southfield, Mich.

[73] Assignee: Chrysler Corporation, Highland Park, Mich.

[22] Filed: Sept. 18, 1972

[21] Appl. No.: 289,904

[52] U.S. Cl............................................ 123/119 A
[51] Int. Cl. ......................... F02b 33/00, F02m 7/00
[58] Field of Search ................................. 123/119 A

[56] References Cited
UNITED STATES PATENTS

| | | | |
|---|---|---|---|
| 1,780,626 | 11/1930 | McIntosh........................ | 123/119 A |
| 2,087,116 | 7/1937 | Prentiss........................... | 123/119 A |
| 3,641,989 | 2/1972 | Hill................................. | 123/119 A |
| 3,646,923 | 3/1972 | Sarto............................... | 123/119 A |

*Primary Examiner*—Manuel A. Antonakas
*Assistant Examiner*—Daniel J. O'Connor
*Attorney, Agent, or Firm*—Talburtt & Baldwin

[57] ABSTRACT

Automobile exhaust gases are recycled by means of a recycling duct which receives these gases at a restricted upstream end located within the environment of the hot gases of the exhaust system, passes in heat exchange relationship through the conventional intake manifold hot spot to facilitate heating of the latter, and discharges the hot exhaust gases at a restricted downstream end in opposition to the inlet flow of the fuel-air mixture at a location directly below the throttle valve. A second restricted duct extends within the sidewall of the carburetor inlet induction conduit and bypasses the throttle valve, opens into the induction conduit upstream of the throttle valve to receive inlet gases during idle, and discharges into the recycling duct between the latter's upstream and downstream restrictions to inhibit exhaust flow through said recycling duct during engine idle operation.

16 Claims, 1 Drawing Figure

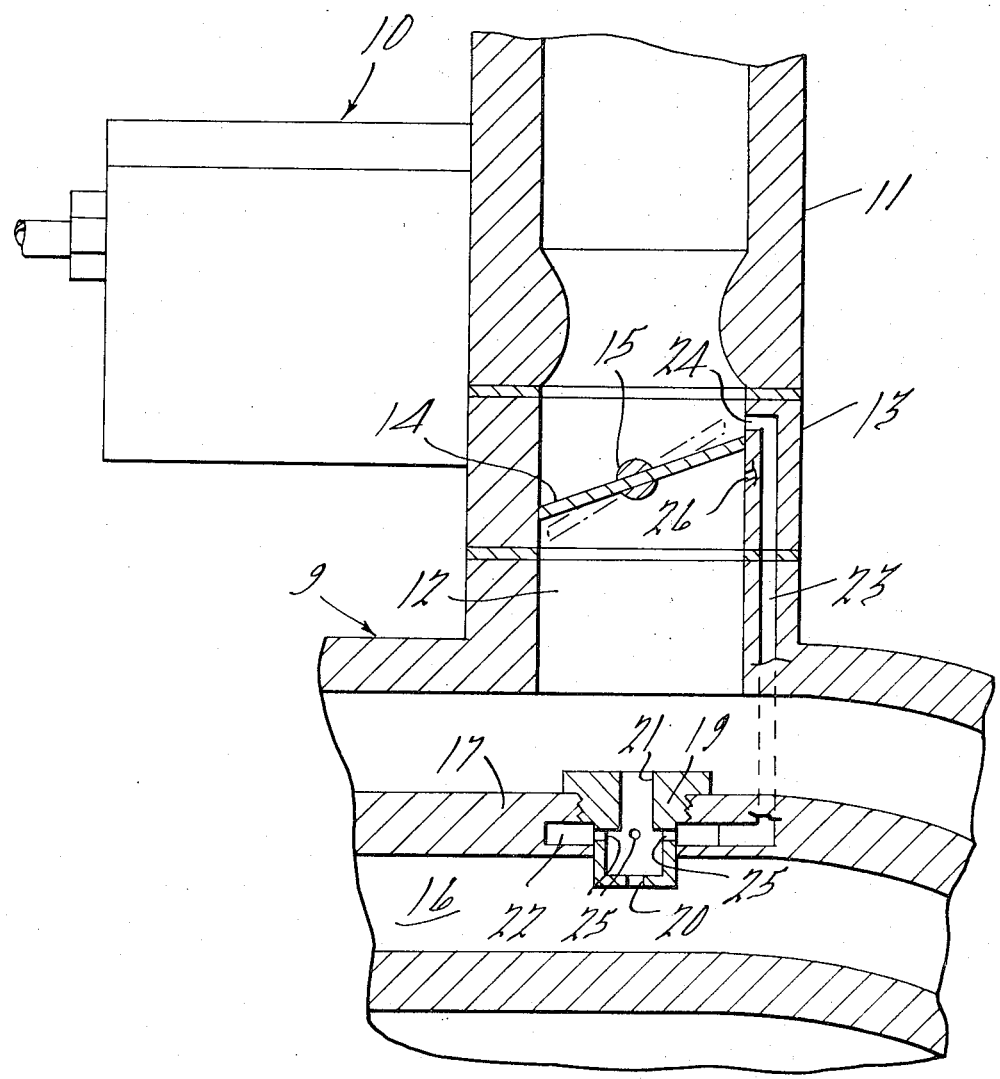

EXHAUST RECIRCULATION

BACKGROUND AND SUMMARY OF THE INVENTION

In the prior art, numerous systems have been devised to recycle exhaust gas into the fuel-air induction system of an automobile engine for the purposes of pre-heating and vaporizing the incoming air-fuel mixture to facilitate its complete combustion in the combustion zone, for re-using the unignited or partially burned portions of the fuel which would otherwise pass out the exhaust pipe and into the atmosphere, and for reducing the oxides of nitrogen emitted from the exhaust system into the atmosphere. It has been found that approximately 15 percent exhaust gas recycling is required at moderate engine loads to substantially reduce the nitrogen oxide content of the exhaust gases discharged in the atmosphere.

Although the prior art structures have had the desired effect of reducing the content of nitrogen oxides in the exhaust by reducing the maximum combustion temperature in consequence of diluting the fuel-air mixture with recycled exhaust gases during certain operating ocnditions of the engine, these structures have been undesirable from the standpoints of both cost and operating efficiency and have been complicated by the desirability of reducing the recycling during conditions of both engine idling when nitrogen oxide emission is a minor problem and wide open throttle when maximum power is required, while progressively increasing the recycling of exhaust gases with increasing engine speed during cruising condition or with increasing engine load at part open throttle. The nitrogen oxide emission is a direct function of combustion temperature and for that reason is less critical during engine idling when the rate of fuel combustion and the consequent combustion temperature are minimal, and during wide open throttle conditions which are ordinarily of short duration.

In the usual gasoline or hydrocarbon fuel type engine, fuel combustion can take place at about 1,200° F. The formation of nitrogen oxides does not become particularly objectionable until the combustion temperature exceeds about 2,200° F., but the usual engine combustion temperature which increases with engine load or the rate of acceleration at any given speed frequently rises to about 2,500° F. It is known that the recycling of at least one-twentieth and not more than one-fourth of the total exhuast gases through the engine, depending on the load or power demand, will reduce the combustion temperature to less than 2,200° F. The desired result is usually obtained with the ordinary engine upon the recycling of about 15 percent of the total exhaust gases during partially open throttle as aforesaid.

An important object of this invention is to provide improved means uncomplicated by moving parts comprising a restricted recycling duct for recirculating a portion of the combustion products from the exhaust system to the inlet system of an automobile engine to overcome or avoid the problems and deficiencies of the prior art, as well as to achieve a number of important results including preheating and improved mixing and carburetion of the fuel-air mixture in the inlet header and the reduction of nitrogen oxides in the exhaust.

Another and more specific object is to provide such an exhaust recycling system wherein an upstream restriction for the recycling duct is adjacent the latter's upstream end within the environment of the hot exhaust gases at temperatures appreciably greater than 700° F. and spaced from the hot spot to minimize heat loss thereto. Such a construction is particularly suitable for use with fuels containing lead additives to improve combustion characteristics.

The resulting lead oxides in the exhaust exist in a vapor phase at temperatures above approximately 700° F. The latter temperature is well below the exhaust temperature available but is somewhat higher than the usual temperature of the hot spot, which is continually cooled by impingement of the comparatively cold inlet fuel and air mixture and the vaporization of liquid fuel droplets within the mixture. By locating the upstream recycling restriction within the environment of the hot exhaust gases, the temperature of the latter restriction will preferably be maintained above 800° F. and the exhaust gases containing lead oxide vapors will pass readily through the hot restriction without condensing thereat. If any lead oxides do condense and deposit within a cooler downstream portion of the bypass duct, these deposits will be within an enlarged portion of the recycling duct and will be relatively harmless. The downstream restriction of the recycling duct will be a comparatively large port capable of freely allowing passage of exhaust particulates, if any.

Exhaust flow through the recycling duct is materially reduced or retarded during engine idle operation by means of an idle exhaust recycling inhibitor duct, comprising a second restricted duct which communicates between the carburetor inlet induction conduit upstream of the usual throttle valve and the recycling duct downstream of the latter's hot upstream restriction, thereby to prevent any substantial pressure differential across the latter restriction during idle operation.

By virtue of the foregoing, communication will exist at all times between the exhaust and inlet systems but recycling of the hot exhaust gases will be reduced during idle operation. The downstream opening of the recycling duct opposing the flow of the inlet mixture will be shielded by the throttle valve when the latter is partly open, but will be exposed in the manner of a pitot opening to approximately the full velocity pressure of the inlet mixture at wide open throttle, whereby the proportion of the bypass flow relative to the total inlet air flow may be effectively reduced at wide open throttle. Also the high temperature of the exhaust at wide open throttle tends to reduce the exhaust density as compared to the lower temperatures during moderate acceleration, so that the effective exhaust recycling at wide open throttle is less than it would be otherwise. By suitably determining the size of the various restrictions, the recycling flow will be contained approximately within the limits of more than 5 percent and less than 25 percent, and usually about 15 percent of the total exhaust gases when the throttle is partially open and the effective pressure differential between the ends of the recycling duct corresponds to cruising or part throttle acceleration conditions.

Within the range from idle to light or moderate load conditions, the total fluid flow through fixed recycling orifices of the type comprising the present invention increases at any given engine speed with increasing engine load. For example in a conventional automobile engine, the pressure downstream of the throttle varies roughly in the neighborhood of from one half atmosphere during idling to approximately one atmosphere at wide open throttle, while the exhaust pressure simultaneously varies roughly from one to two atmospheres. These factors compensate for the increasing combustion temperature with increasing load and result in a desirable increase in the effectiveness of the exhaust recycling through the fixed recycling restrictions with increasing load or acceleration.

In addition, the upstream end of the second restricted or inhibitor duct opens adjacent and upstream of the leading edge of a conventional pivotal blade or butterfly-type throttle valve when the latter is at its closed or idle position, such that on partial opening of the throttle valve to a part load position, the leading edge of the throttle valve will swing to a position upstream of the adjacent opening of the inhibitor duct. In consequence the pressure at the latter opening will drop rapidly. Simultaneously the exhaust pressure will increase with increasing load, so that the pressure differential causing inlet gas flow through the inhibitor duct into the recycling duct will decrease, the inhibition of exhaust recycling flow through the recycling duct will decrease, and the exhaust recycling flow will increase to the desired extent, depending upon the sizes of the restrictions and the engine operating characteristics. In fact, as the throttle continues to open, the exhaust pressure within the recycling duct eventually will usually exceed the inlet gas pressure at the leading edge of the throttle valve and a reverse flow through the inhibitor duct will occur to increase the exhaust recycling with increasing load.

As the engine load or acceleration decreases and the speed increases to the cruising condition, the combustion temperature and the pressure differential across the recycling duct decrease, as does also the total quantity of exhaust gases and the pressure at the upstream end of the inhibitor duct located downstream of the partially open throttle. Thus the rate of exhaust recycling declines for improved fuel economy, again as desired because less recycling is required to maintain the combustion temperature below the level at which nitrogen oxide formation is objectionable.

As the pressure differential between the inlet and exhaust headers increases with increasing load, the effective resistance of the fixed restrictions to the exhaust recycling flow increases because the flow rate through the recycling duct varies approximately as the square root of the pressure differential. Thus at wide open throttle, the proportion of the total exhaust gases that is recycled is somewhat less than the proportion recycled at partially open throttle. This factor also is as desired because the customary excess fuel enrichment at wide open throttle in cooperation with the recycled exhaust gases is adequate to prevent overheating during the combustion process and reduce the formation of nitrogen oxides to the tolerable level.

Another object is to provide an exhaust recycling system of the above character wherein the second or inhibitor duct extends within the sidewall of the inlet induction conduit downstream of the throttle valve, thereby to provide a cooling effect on the adjacent sidewall through which the customary idle inlet fuel is supplied and to facilitate idle fuel metering. During engine acceleration when the hot exhaust gases flow reversely from the recycling duct to the induction conduit, these gases tend to heat the sidewall of the induction conduit, but idle fuel metering is no problem under such conditions. Also the increased flow of comparatively cool inlet gases within the induction conduit during acceleration prevents overheating of the sidewall of the induction conduit.

Other objects of this invention will appear in the following description and appended claims, reference being had to the accompanying drawings forming a part of this specification wherein like reference characters designate corresponding parts in the several views. The single FIGURE of the drawing is a schematic fragmentary cross sectional view through an automobile engine induction system showing a system embodying the present invention for recycling exhaust gases.

DESCRIPTION OF A PREFERRED EMBODIMENT

An application of the present invention is illustrated by way of example with an automobile engine 9 having a carburetor 10 providing the inlet fuel-air induction conduit 11, which comprises the upstream portion of an inlet header 12 for supplying a combustible fuel and air mixture to the engine cylinders. The carburetor 10 may comprise any conventional type which has the usual air inlet at the upstream end of the induction conduit 11, the usual fuel metering system and nozzles or jets for supplying idle and operating fuel to the conduit 11 during various operating conditions and for enriching the fuel supply during acceleration and wide open throttle. An example of such a carburetor is illustrated by way of example in Ball U.S. Pat. No. 2,966,344 so that the foregoing conventional features disclosed in the latter patent are incorporated herein by reference and are not described in detail.

The downstream portion of the induction conduit 11 comprises the customary throttle body 13 containing the conventional butterfly type throttle valve 14 pivotal at 15. The inlet fuel-air mixture is conducted via the header or manifold 12 to the engine cylinders. After combustion of the fuel-air mixture in the engine cylinders, the exhaust gases are discharged through a muffler to the atmosphere.

Usually left and right exhaust manifolds are connected by an exhaust crossover conduit 16 which conducts the hot exhaust gases into heat exchange relationship with a portion 17 of the wall of the inlet header 12. The wall portion 17 extends transversely to the direction of flow of the inlet mixture and is commonly referred to as the "hot spot" which preheats the inlet mixture and enhances vaporization and mixing of liquid fuel droplets.

The structure described thus far may also be conventional, as illustrated in Sarto U.S. Pat. No. 3,646,923, which is incorporated herein by reference.

Associated with the throttle valve 14 and extending through the hot spot 17 is a restricted exhaust recycling duct 19 which extends directly from the exhaust crossover conduit 16 and has an upstream orifice or restriction 20 at its lower end opening within the interior of conduit 16 at a location spaced inwardly from the latter's inner wall surface. Thus non-gaseous combustion products cannot readily enter and accumulate within the duct 19 and clog the recycling system. Where the exhaust contains appreciable quantities of materials that tend to form gummy residues upon cooling, as for example in giving up heat to the hot spot 17, these residues have less tendency to deposit within the hot passage 16 than in the cooler upper portion of the duct 19 which is cooled by the inlet fuel and air mixture. In fact such materials including lead additives will usually pass freely in a gaseous state through restriction 20. The upper end of duct 19 discharges through a downstream restriction or orifice 21 into the header 12 directly below valve 14 and in opposition to the inlet fuel-air flow to warm the latter and to facilitate mixing and vaporization of the fuel within the inlet air.

In order to inhibit exhaust flow through restricted orifice 20 during idle operation of the engine when the throttle valve 14 is at the idle position shown by solid lines, the nearly atmospheric inlet pressure above the valve 14 is communicated to duct 19 via a second restricted or exhaust flow inhibitor duct 23. The latter extends within the sidewall of the inlet header 12 from a port 24, which opens into header 12 adjacent and upstream of the upper leading edge of valve 14 when the latter is at the idle position shown, and opens at its lower end into an annular duct 22 which extends coaxially around the duct 19 and communicates with a plurality of restricted orifices 25 extending radially through the duct 19 at a location between the restrictions 20 and 21. In consequence during idle operation, only a comparatively small pressure differential will exist across restriction 20 because the exhaust pressure in passage 16 will only be slightly greater than atmospheric during idle. The actual pressure differential will be determined by the sizes of the orifices 20, 21 and 25.

The orifices 25 are dimensioned so that the air flow through duct 23 into duct 19 and thence into header 12 will amount to between approximately 50 and 80 percent of the desired idle air required to support combustion of idle fuel supplied by the customary idle fuel port 26. The remaining idle air will be supplied by leakage around the edges of the throttle valve 14 and via the port 26 in a partially atomized fuel-air mixture. The orifice 21 will be somewhat larger than orifice 20 and will be determined so that the exhaust recycling at idle will be reduced to a value in the neighborhood of 5 percent of the total exhaust and preferably less.

As the throttle valve 14 opens from the idle position shown in solid lines to the dotted position, the pressure at orifice 24 will fall rapidly and will approximate the pressure in header 12 adjacent orifice 21. The duct 23 will then have little inhibiting influence on the exhaust recycling flow, which flow will then be determined primarily by the pressure differential across orifice 20. Upon continued opening of the throttle 14, the exhaust pressure at the orifices 25 will eventually exceed the inlet pressure at orifice 24 and the direction of flow in duct 23 will reverse. The exhaust recycling flow will then be proportioned between orifice 21 and duct 23 in accordance with their relative restrictions to effect a total exhaust recycling flow in the neighborhood of 15 percent of the total exhaust flow.

At wide open throttle, the upwardly directed orifice 21 will not be shielded by the throttle valve from the full blast of the inlet flow, so that the exhaust recycling through restriction 21 will be hampered by pitot action. This factor, in cooperation with the aforesaid flow relationship proportional to the square root of the pressure differential across orifice 20 and the temperature-density relationship of the high temperature exhaust gas at wide open throttle, will effect a reduction in the proportion of exhaust recycling through duct 19 at wide open throttle, compared to the total exhaust flow, even though the total exhaust recycling will increase steadily as the throttle approaches the wide open condition.

The duct 23 extends axially through a major portion of the throttle body 13 and adjacent the idle fuel metering port 26, so that during idle operation the inlet air flowing downwardly through duct 23 to duct 19 will tend to cool the throttle body 13 at the region of idle fuel port 26 and enhance idle fuel metering by preventing premature vaporization of fuel before being metered through port 26. During part acceleration when idle metering is unimportant, overheating of the sidewall of header 12 by upward flow of hot exhaust gases through duct 23 to port 24 is prevented by the greatly increased downward flow of cool inlet gases within header 12.

I claim:
1. In an internal combustion engine,
   A. an inlet header for conducting a combustible fuel-air mixture into said engine,
   B. a throttle valve movable in said header between idle and open positions,
   C. an exhaust header for discharging combustion products from said engine, and
   D. means for recycling exhaust gases from said exhaust header to said inlet header as a function of engine operation to inhibit the formation of nitrogen oxides comprising recycling duct means having

1. a restricted upstream opening communicating with said exhaust header to receive exhaust gases,
   2. means for discharging the last named exhaust gases into said inlet header at a location downstream of said throttle valve when the latter is at its idle position comprising a first restricted downstream opening communicating with said inlet header at said location, and
   3. a second restricted downstream opening communicating with said recycling duct means at a location between said upstream opening and first downstream opening, and
   4. means for increasing the pressure at the last named location when said throttle valve moves from an open to its idle position comprising
      a. a pressure conducting inhibitor duct communicating with said second downstream opening, and
      b. means for increasing the pressure in said inhibitor duct when said throttle valve moves from said open to its idle position.

2. In the combination according to claim 1, said inhibitor duct communicating with said inlet header at a location whereat the pressure therein decreases upon predetermined opening movement of said throttle valve from its idle position, the restrictions for said openings being dimensioned with respect to each other to effect air flow from said inlet header through the second downstream opening amounting to between approximately 50 and 80 percent of the desired air to support idle combustion when said throttle valve is at its idle position.

3. In the combination according to claim 1, said inhibitor duct communicating with said inlet header upstream of said throttle valve at the idle position at a location whereat the pressure decreases upon predetermined opening movement of said throttle valve from said idle position, the restrictions for said openings being dimensioned so that when said throttle valve is at its idle position, the pressure in said inlet header upstream of said throttle valve is greater than the pressure in said recycling duct means between said upstream opening and first downstream opening, thereby to inhibit the flow of exhaust gases through said upstream opening.

4. In the combination according to claim 3, the restrictions for said openings being also dimensioned to effect a flow of exhaust gases into said inlet header via said second downstream opening, upon predetermined opening of said throttle valve.

5. In the combination according to claim 2, said throttle valve comprising a blade pivotal in said inlet conduit between idle and open positions and having an upstream edge at said idle position adjacent and downstream of said location whereat said inhibitor duct communicates with said inlet header, said blade being arranged to swing upstream of the last named location upon predetermined opening of said throttle valve from said idle position, the restrictions for said openings being dimensioned to effect fluid flow from said inlet header through said second downstream opening to inhibit fluid flow from said exhaust header through said upstream opening when said throttle valve is at its idle position.

6. In the combination according to claim 3, the restrictions for said openings being dimensioned with respect to each other to effect air flow from said inlet header through the second downstream opening amounting to between approximately 50 and 80 percent of the desired air to support idle combustion when said throttle valve is at its idle position.

7. In the combination according to claim 1, said exhaust header having a wall portion extending transversely to the flow of said fuel-air mixture in said inlet header to provide a hot spot for impingement of said mixture thereagainst, the first downstream opening of said recycling duct extending through said hot wall in heat transfer relationship.

8. In the combination according to claim 7, said first downstream opening being directed in opposition to the flow of said fuel-air mixture at the region of said hot wall.

9. In the combination according to claim 3, said inhibitor duct extending in the sidewall of said inlet header in heat exchange relationship therewith, thereby to cool said sidewall by air flow through said inhibitor duct when said throttle valve is at said idle position, and an idle fuel duct extending in said sidewall for conducting an idle fuel and air mixture into said inlet conduit downstream of said throttle valve, said idle fuel duct extending in said sidewall adjacent said inhibitor duct in heat exchange relationship therewith.

10. In the combination according to claim 9, said throttle valve comprising a blade pivotal in said inlet conduit between idle and open positions and having an upstream edge at said idle position adjacent and downstream of said location whereat said inhibitor duct communicates with said inlet header, said blade being arranged to swing upstream of the last named location upon predetermined opening of said throttle valve from said idle position, the restrictions for said openings being dimensioned to effect fluid flow from said inlet header through said second downstream opening to inhibit fluid flow from said exhaust header through said upstream opening when said throttle valve is at its idle position, the restrictions for said openings being also dimensioned to effect a flow of exhaust gases into said inlet header via said second downstream opening upon predetermined opening of said throttle valve.

11. In the combination according to claim 1, said means for increasing the pressure in said inhibitor duct comprising means for communicating the same with substantially atmospheric pressure when said throttle valve is at its idle position.

12. In the combination according to claim 1, said first downstream opening of said recycling duct means being comparatively larger than said upstream opening thereof to facilitate passage of exhaust particulates.

13. In the combination according to claim 2, said first downstream opening of said recycling duct means being comparatively larger than said upstream opening thereof to facilitate passage of exhaust particulates.

14. In the combination according to claim 13, said throttle valve comprising a blade pivotal in said inlet conduit between idle and open positions and having an upstream edge at said idle position adjacent and downstream of said location whereat said inhibitor duct communicates with said inlet header, said blade being arranged to swing upstream of the last named location upon predetermined opening of said throttle valve from said idle position, the restrictions for said openings being dimensioned to effect fluid flow from said inlet header through said second downstream opening to inhibit fluid flow from said exhaust header through said upstream opening when said throttle valve is at its idle position.

15. In the combination according to claim 6, said first downstream opening of said recycling duct means being comparatively larger than said upstream opening thereof to facilitate passage of exhaust particulates.

16. In the combination according to claim 15, said throttle valve comprising a blade pivotal in said inlet conduit between idle and open positions and having an upstream edge at said idle position adjacent and downstream of said location whereat said inhibitor duct communicates with said inlet header, said blade being arranged to swing upstream of the last named location upon predetermined opening of said throttle valve from said idle position, the restrictions for said openings being dimensioned to effect fluid flow from said inlet header through said second downstream opening to inhibit fluid flow from said exhaust header through said upstream opening when said throttle valve is at its idle position.

* * * * *